United States Patent [19]

Thomas et al.

[11] 4,105,710

[45] Aug. 8, 1978

[54] FLAME-RETARDANT COPOLYMERS

[75] Inventors: James L. Thomas, Hamilton Square; Gert P. Volpp, Princeton, both of N.J.

[73] Assignee: FMC Corporation, Philadelphia, Pa.

[21] Appl. No.: 631,239

[22] Filed: Nov. 12, 1975

[51] Int. Cl.² ............................................. C08L 67/06
[52] U.S. Cl. .................................... 260/869; 260/861
[58] Field of Search ................... 260/869, 861, 475 N, 260/45.75 B, 45.75 R

[56] References Cited

U.S. PATENT DOCUMENTS

| | | | |
|---|---|---|---|
| 2,433,616 | 12/1947 | Marple et al. | 260/78.4 |
| 2,443,888 | 6/1948 | Bohrer | 260/826 |
| 2,614,085 | 10/1952 | Lundberg | 260/2 |
| 3,221,044 | 11/1965 | Hoch | 260/475 |
| 3,337,624 | 8/1967 | Hoch | 260/558 |
| 3,340,226 | 9/1967 | Stivers | 260/45.75 |
| 3,354,191 | 11/1967 | Stivers | 260/448 |
| 3,511,748 | 5/1970 | Hoch et al. | 161/165 |
| 3,573,215 | 3/1971 | Nametz et al. | 252/192 |
| 3,624,024 | 11/1971 | Caldwell et al. | 260/40 R |
| 3,640,949 | 2/1972 | Dalzell | 260/45.75 R |
| 3,642,724 | 2/1972 | Schmidt et al. | 260/869 |
| 3,689,453 | 9/1972 | Segro | 260/41 AG |
| 3,697,625 | 10/1972 | Smith et al. | 260/869 |
| 3,738,958 | 6/1973 | Paul | 260/45.75 B |
| 3,751,454 | 8/1973 | Minami et al. | 260/501.14 |
| 3,843,750 | 10/1974 | Roberts et al. | 260/862 |
| 3,911,050 | 10/1975 | Cooke et al. | 260/869 |
| 3,936,414 | 2/1976 | Wright et al. | 260/40 R |
| 3,937,756 | 2/1976 | Klein et al. | 260/869 |
| 3,953,397 | 4/1976 | Richter et al. | 260/45.75 B |
| 4,001,179 | 1/1977 | Richter et al. | 260/45.75 B |
| 4,003,862 | 1/1977 | Albright | 260/2.5 AJ |

OTHER PUBLICATIONS

Lyons, The Chem. & Uses of Fire Retardants, (Wiley-Interscience, 1970), pp. 15, 17, 91, 92, 96, 99, 101.
Chem. Abs. 68:P40468u; 73:P56729u; 75:P89130m; 75:P99043z.
Lyons, The Chem. & Uses of Fire Retardants, (Wiley-Interscience, 1970), pp. 363–364; 385, 391, 393–396.

*Primary Examiner*—Thomas De Benedictis, Sr.
*Attorney, Agent, or Firm*—Milton Zucker; Frank Ianno

[57] ABSTRACT

Flame retardancy is imparted to curable vinyl-unsaturated polymers such as unsaturated polyesters and diallyl and dimethallyl phthalates, by incorporating with them from about 5 to 50% of total copolymer weight of diallyl tetrabromophthalate, a monomer which copolymerizes with the unsaturated polymer.

4 Claims, No Drawings

FLAME-RETARDANT COPOLYMERS

This invention relates to the flameproofing of polymeric plastics, in particular vinyl-unsaturated thermosetting polymers such as unsaturated polyesters and the diallyl phthalates.

It has long been desirable to provide plastics with a greater degree of flame resistance, and the problem has been tackled from a number of angles. It is known that the introduction of chlorine or bromine into the molecule to replace hydrogen imparts some flame resistance, and that bromine is superior to chlorine for this purpose. Certain inorganic additives - particularly antimony oxide - have likewise been suggested for this purpose.

In the production of flame-retardant polymers which are thermosetting because of their vinyl unsaturation, such as the unsaturated polyesters and the diallyl and dimethallyl phthalates, the known flameproofing methods have involved the use of antimony oxide, the use of polyesters of highly chlorinated materials such as chlorendic anhydride and tetrachlorophthalic anhydride, in conjunction with unsaturated acids such as maleic anhydride, and the use in diallyl phthalate resins of some diallyl tetrachlorophthalate or diallylchlorendate as comonomers (see, for example, Segro U.S. Pat. Nos. 3,689,453, Sept. 5, 1972). It has also been suggested to use a heavy metal salt of tetrabromophthalic acid as a flameproofer in plastics, such as polyurethanes, polystyrene, polyethylene and polypropylene (Stivers U.S. Pat. Nos. 3,340,226, Sept. 5, 1967 and Stivers 3,354,191, Nov. 21, 1967). At least one recommended flameproofer - brominated biphenyl - has been withdrawn from the market as a potential health hazard.

In general, flame retardancy is measured by ASTM Method: D 2863-74 for oxygen index; an oxygen index of about 27–28 or higher is generally considered acceptable. At a loading of flame-retardancy agent necessary to get this oxygen index, known flame-retardancy agents introduce one or more weaknesses into finished thermoset compositions. In unsaturated polyesters, lowering of the heat-deflection temperature is a common problem, often accompanied by a drop in flexural strength. In the case of the diallyl phthalate polymers, desirable electrical properties are sacrificed. In addition, known flame retardants tend to give rather poor results in high-temperature use.

We have discovered that the introduction of diallyl tetrabromophthalate (hereafter DATBP) as a copolymerizing monomer into thermosetting vinyl-unsaturated prepolymers such as unsaturated polyesters and diallyl and dimethallyl phthalates, in amounts of about 5 to 50% of the total polymerizable material, will produce marked improvement in flame retardancy, without substantial adverse effect on other properties obtainable with the compositions without the DATBP.

DATBP, made in any desired fashion, is a polymerizable monomer. We have found that it will thermoset when appropriately catalyzed with any typical vinyl polymerization catalyst (e.g. t-butyl perbenzoate); the homopolymer has a very high oxygen index, a high heat-deflection temperature, and rather good electrical properties, particularly under wet conditions.

The following examples are given as indicative of homopolymerization procedures. Temperatures are in degrees centigrade.

EXAMPLE 1 - Homopolymerization

The polymerization activity of diallyl tetrabromophthalate was observed by adding 0.015 g of t-butyl perbenzoate to 5 g of the monomer and casting between glass plates using ⅛ inch teflon spacers. The casting cycle was 5 hours at 120°, then 16 hours at 110°. The clear, amber casting had the following properties:

| | |
|---|---|
| Oxygen Index | 46.6 |
| Percent Shrinkage | 8.1 |

One hundred grams of the monomer was also polymerized with 2 g of t-butyl perbenzoate at 110° for 64 hours. A casting ⅛ inch × 1.5 inches × 5 inches was prepared for heat-deflection temperature.

The heat-deflection temperature at 264 psi was 160°.

An ⅛ inch casting approximately 3 inches × 3 inches was cast 64 hours at 105° for electrical properties:

| | |
|---|---|
| Dielectric constant $10^3/10^6$ cycles | 3.17/3.23 |
| Dielectric constant $10^3/10^6$ cycles (wet) | 3.21/3.23 |
| Dissipation factor $10^3/10^6$ cycles | .0034/.0042 |
| Dissipation factor $10^3/10^3$ cycles (wet) | .0043/.0048 |

DATBP will copolymerize with all the typical unsaturated polyesters, e.g. polyesters which are esters of a glycol and a polybasic acid, of which sufficient is unsaturated so that the composition will thermoset when appropriate catalyzed with a vinyl polymerization catalyst. The criteria for such products are well known in the art; in general, about 25 to 50 mol percent of the polybasic acid is unsaturated (e.g. maleic acid), and the glycol is difunctional. They may be used uncut, or mixed with a vinyl-unsaturated material such as styrene, methyl acrylate, methyl methacrylate and the like.

These compositions are typically flameproofed by using, as the saturated acid in the polyester, a highly chlorinated dibasic acid, such as chlorendic anhydride or tetrachlorophthalic acid. Such compositions have rather low heat-deflection temperatures compared with unflameproofed compositions and do not perform well under high-temperature conditions.

When 10 to 50%, based on total polymerizable material, of DATBP is incorporated into such compositions, improved flame retardancy is attained, with good performance at high temperatures. The following examples illustrate this.

EXAMPLE 2 — ROOM-TEMPERATURES-CURED POLYESTER WITH DIALLYL TETRABROMOPHTHALATE

Unfilled casting were prepared by pouring the liquid resin into a mold made by two sheets of lucite separated by ¼ inch teflon spacers. Castings were approximately 5 inches × 8 inches and were allowed to stand a minimum of 7 days prior to testing.

The following table gives the composition of test casting and the properties obtained:

| | | Unfilled Castings of Polyesters With Diallyl Tetrabromophthalate Room-Temperature Cure | | |
|---|---|---|---|---|
| Example | Index | Strength | Oxygen | Flexural |
| 2 A | 25/25/50 | DATBP/styrene/polyester of glycol with 1/1 molar ratio of maleic anhydride and isophthalic acid (Dion 6421) | 27.0 | — |
| 2 B | 50/50 | DATBP/Dion 6421 | 38–11 | — |
| 2 C | 10/45/45 | DATBP/styrene/Dion 6421 | 21.8 | 18,600 |
| PA 1 | 50/50 | Styrene/polyester of glycol with 1/1 molar ratio of maleic anhydride and chlorendic anhydride (Hetron 92) | 25.8 | 15,000 |
| PA 2 | 50/50 | Styrene/Dion 6421 | 18.9 | 12,700 |

EXAMPLE 3 — ROOM-TEMPERATURES-CURED POLYESTER GLASS MAT LAMINATES

Glass mat laminates were prepared as follows:

Three layers of 1½ ounce chopped strand glass mat approximately 3 inches × 4 inches and weighing about 28 g were saturated in the catalyzed and promoted resin syrup by pouring the resin between and on the top surface. Good penetration was insured by squeezing the layers between Mylar with a paint roller. The panels generally gelled to a firm gel in about 20 minutes, but were not tested for a minimum of 7 days. Hetron 92 polyester was included because this resin has wide commercial use as a flame-resistance material. The compositions and properties are given in the following table:

EXAMPLE 4 — DIALLYL TETRABROMOPHTHALATES IN POLYESTER PREMIX MOLDING COMPOUNDS

Polyester molding compounds were prepared using a Reedco double-arm mixer. All ingredients were added and mixed to a putty composition, then the chopped glass was added. Mixing was stopped when there was no evidence of raw glass present.

Properties were determined on test specimens that were compression-molded at 300° F for 5 minutes.

Compositions containing 35% resin, 20% glass and 45% filler, with the resin portion being 10% of DATBP, were found to have high oxygen indexes, high heat-deflection temperatures and excellent physical properties.

| Room-Temperature Cured Polyester Glass Mat Laminates | | | | | |
|---|---|---|---|---|---|
| Sample Reference (grams) | PA 3 | PA 4 | 3 D | 3 E | 3 F |
| Hetron 92 polyester of PA 1 | 90 | 90 | — | — | — |
| Styrene | 10 | 10 | — | — | — |
| 50/50 Styrene/Dion 6427* | — | — | 75 | 75 | 85 |
| DATBP | — | — | 25 | 25 | 15 |
| Methylethylketone peroxide | 1.0 | 1.0 | 1.5 | 1.5 | 1.5 |
| 6% Cobalt naphthenate | 0.5 | 0.5 | 0.5 | 0.5 | 0.5 |
| Antimony oxide | — | 5 | — | 5 | 5 |
| 1-1/2 ounce glass mat | 28 | 28 | 28 | 28 | 28 |
| Oxygen index | 26.7 | 41.2 | 24.1 | 34.8 | 29.7 |
| Rockwell hardness, M | 107 | 105 | 104 | 106 | 101 |
| Flexural strength, psi | 29,100 | 26,800 | 26,800 | 30,100 | 22,000 |
| Modulus × $10^6$ psi | 1.3 | 1.2 | 1.2 | 1.4 | 0.8 |
| Tensile strength, psi | 16,600 | 11,200 | 11,200 | 8,100 | 10,600 |

*polyester of glycol and maleic-isophthalic acid in 2/1 molar ratio

The properties obtained are given in the following table:

| Diallyl Tetrabromophthalates in Premix Molding Compounds | | | | |
|---|---|---|---|---|
| Sample Reference (grams) | 4 G | PA 5 | 4 H | PA 6 |
| Unsaturated polyester of 2D | — | — | 74 | — |
| 30/70 Styrene/Dion 6427 | 360 | — | — | — |
| DATBP | 40 | — | 26 | — |
| Hetron 92 | — | 400 | — | 100 |
| t-butylperbenzoate | 12 | 12 | 2 | 2 |
| Camel Tex (ground limestone) | 260 | 260 | — | — |
| Burgess clay | 220 | 220 | 110 | 110 |
| ¼" glass | 232 | 232 | 75 | 75 |
| Antimony oxide | 40 | 40 | — | — |
| Oxygen index | 28.0 | 42.4 | >40 | 31.0 |
| Heat deflection, ° C at 264 psi | 292 | 130 | | |
| Izod impact, foot pounds | 2.3 | 2.4 | | |
| Rockwell hardness, M | 92 | 92 | | |
| Specific gravity | 1.84 | 1.96 | | |
| Flexural strength, psi | 13,600 | 8,800 | | |
| Dielectric constant $10^3/10^6$ | 4.7/4.6 | 4.8/4.7 | | |
| Dielectric constant $10^3/10^6$ (wet) | 5.1/4.7 | 5.0/4.8 | | |
| Dissipation factor $10^3/10^6$ | .025/.007 | .025/.006 | | |
| Dissipation factor $10^3/10^6$ (wet) | .04/.013 | .04/.011 | | |
| Volume resistivity 720 hours (wet) | 6 × $10^6$ | — | | |

Example 4 illustrates the basic problem with the chlorinated copolymers - the very low heat-deflection temperature which indicates the rather poor performance of such compositions in high-temperature applications.

With diallyl phthalate compositions, similarly good flame retardancy can be obtained by mixing a diallyl phthalate prepolymer composition with 10 to 50% of DATBP. Diallyl phthalate prepolymers are linear or slightly branched, solid polymers containing residual unsaturation, prepared by polymerizing diallyl or dimethallyl esters of one of the phthalic acids - ortho, meta or para. The number average molecular weight of the prepolymer is generally less than about 10,000. These prepolymers are normally characterized by their precipitated polymer viscosity which is measured as a 25% solution of prepolymer in diallyl phthalate monomer at 25° C. The precipitated polymer viscosity is generally in the range of about 100–1,000 centipoises, and preferably 200–700 centipoises. These prepolymers, when properly catalyzed, thermoset to cured insoluble polymers with excellent electrical properties.

EXAMPLE 5 — DIALLYL TETRABROMOPHTHALATE IN DIALLYL PHTHALATE MOLDING COMPOUND

DATBP was evaluated at the 3.1 and 2.3% (total composition weight) levels in a diallyl orthophthalate molding compound in which the prepolymer had an average molecular weight of 5,000. The compounds contained about 35% glass, 21% filler and 44% resin.

The compound was prepared by dissolving the resin, monomer and catalyst in acetone to make a solution of approximately 50%. All other ingredients were slurred in the solution, then spread out to dry overnight. The saturated glass and filler were then milled on a differential speed mill at 190°–220° F to densify and sheet to a grindable product. The ground sheet, which resembles small pellets, was then used for molding test specimens. Samples were made at 300° F over a 5-minute period via compression molding.

In addition to determining the flame-resistance properties, the arc track resistance was determined and the compositions were evaluated via the ASL crystal test. The ASL crystal test was developed by the Navy and involves heating a molded part at 155° C for 96 hours with an apparatus that can condense any sublimed component. Diallyl phthalate compositions have been known to sublime phthalic anhydride. This is considered troublesome for specific uses such as hermetically sealed microswitches than can be fouled by crystals. DATBP did not form volatile products in this test.

Arc track resistance is also an important property in high-voltage switch gear. Chlorine-containing additives, either reactive or additive, do not have good arc track resistance. DATBP gave good results when evaluated for arc track resistance. The properties that were obtained and the composition are given in the following table:

| Sample Reference (grams) | 5 J | 5 K | Proprietary glass-filled diallyl chlorendate composition -PA 7 |
|---|---|---|---|
| Diallyl-o-phthalate prepolymer | 219 | 219 | |
| DATBP | 17 | 13 | |
| t-butylperbenzoate | 6 | 6 | |
| A-172 vinyl silane | 3 | 3 | |
| Aluminum trihydrate | 113 | 113 | |
| Antimony oxide | 7 | 7 | |
| BP-6 (brominated biphenyl) | — | — | |
| ¼" glass | 190 | 190 | |
| Oxygen index | 29.4 | 28.3 | 28–30 |
| Ignition time, sec. | 89 | 89 | 70 |
| Burning time, sec. | 42 | 49 | 40 |
| Arc track, min. at 2.5 KV | 266 | 315 | 100 |
| ASL crystal test | Trace | Trace | Several |
| Volume resistivity at RT, ohms | $8 \times 10^{14}$ | — | $1 \times 10^{14}$ |
| Volume resistivity (wet), 720 hours, ohms | $3 \times 10^{10}$ | | $1 \times 10^{10}$ |

A test run with brominated biphenyl, a product recently withdrawn from the market as a potential health hazard, gave better results on the ASL crystal test than PA 7, but poorer results than 5J and 5K.

EXAMPLE 6 — DIALLYL TETRABROMOPHTHALATES IN DIALLYL ISOPHTHALATE PREPOLYMER MOLDING COMPOUND

The high-temperature resistance of diallyl isophthalate polymers (Dapon ®-M) with DATBP additive was determined by weight loss and flexural strength retention after high-temperature aging. The methods included aging test specimens in a hermetically sealed container for 72 hours at 220° C, a condition used to evaluate materials for military connectors. Commercial Dapon-M (Glass-filled flameproof) does not perform well in this test. Dapon-M containing either Hetron 92 reactive polyester or diallyl chlorendate, both containing chlorine, performs significantly poorer than DATBP. Also, the monomer appeared to improve the heat stability of Dapon-M in glass-filled molding compositions in oven aging tests.

The formulations were prepared using an acetone solution and the roll-milling procedure described in Example 5 above.

The data collected and the formulation are given below:

| Diallyl Tetrabromophthalate in Dapon-M Heat Resistance | | | | | | |
|---|---|---|---|---|---|---|
| Sample Reference (grams) | PA 8 | 6 L | PA 9 | PA 10 | 6 M | PA 11 |
| Dapon-M | 219 | 219 | 219 | 219 | 720 | 800 |
| DATBP | 0 | 17.0 | | | 80 | — |
| Diallyl chlorendate | | | 25 | | | |
| Hetron 92 | | | | 25 | | |
| t-butylperbenzoate | 6 | | | | 24 | 24 |
| A-172 vinyl silane | 3 | | | | 12 | 12 |
| Aluminum trihydrate | 113 | | | | | |
| Novocite (filler) amorphous silica | | | | | 560 | 600 |
| Antimony oxide | 7 | | | | 40 | — |
| ¼" glass | 190 | | | | 600 | 600 |
| Flexural strength, psi | 12,500 | 13,100 | 12,800 | 12,600 | 14,500 | 14,800 |
| Flexural strength after 72 hours at 220° C in sealed bomb, psi | 9,100 | 8,300 | 4,400 | 2,600 | | |
| Flexural strength after 2500 hours at 200° C, psi | | | | | 2,000 | 1,800 |
| Weight loss after 2500 hours | | | | | | |

| | -continued | | | | | |
|---|---|---|---|---|---|---|
| | Diallyl Tetrabromophthalate in Dapon-M Heat Resistance | | | | | |
| Sample Reference (grams) | PA 8 | 6 L | PA 9 | PA 10 | 6 M | PA 11 |
| at 200° C, % | | | | | 4.9 | 18.3 |

Note that flame retarders other than DATBP markedly reduce flexural strength after 72 hours at 220° C as compared to Dapon-M (compare PA 8, 6 L, PA 9 and PA 10) and 6M and PA 11.

It is noted that the potentially hazardous brominated biphenyl performed well in this test, comparing favorably with PA 8 and 6 L.

Obviously, the examples can be multiplied indefinitely, without departing from the spirit of the invention as defined in the claims.

What is claimed is:

1. A flame-retardant thermosetting vinyl-unsaturated composition comprising a thermosetting vinyl-unsaturated polymer capable of further polymerization to the thermoset stage of the group consisting of unsaturated polyester and diallyl phthalate prepolymers containing as a flame-retarding agent from 5 to 50%, by weight of total polymerizable material, of diallyl tetrabromophthalate, the composition being distinguished not only by its flame resistance but by good high temperature performance.

2. The composition of claim 1, in which the vinyl-unsaturated polymer is a polyester of a glycol and polybasic acid, 25 to 50 mol percent of which is unsaturated.

3. The composition of claim 1, in which the vinyl-unsaturated polymer is diallyl phthalate prepolymer, the compositions being further distinguished by good arc track resistance.

4. The composition of claim 1, in which the vinyl-unsaturated prepolymer is diallyl isophthalate, the compositions being further distinguished by improved resistance to high temperature aging.

* * * * *

UNITED STATES PATENT AND TRADEMARK OFFICE
CERTIFICATE OF CORRECTION

PATENT NO. : 4,105,710
DATED : August 8, 1978
INVENTOR(S) : James L. Thomas and Gert P. Volpp It is certified that error appears in the above—identified patent and that said Letters Patent is hereby corrected as shown below:

Column 2, line 32 "$10^3/10^3$ cycles (wet)" should read --$10^3/10^6$ cycles (wet)--. Columns 3-4, first table, second and third columnar headings "Index" and "Strength" should be deleted; fourth and fifth columnar headings "Oxygen" and "Flexural" should read --Oxygen Index-- and --Flexural Strength--; line "2B", fourth column, "38-11" should read --38-40--.

Signed and Sealed this

Ninth Day of June 1981

[SEAL]

Attest:

RENE D. TEGTMEYER

Attesting Officer — Acting Commissioner of Patents and Trademarks